W. P. COLLINS.
BRAKE MECHANISM.
APPLICATION FILED MAR. 31, 1913.

1,084,792.

Patented Jan. 20, 1914.

Witnesses.
Franklin E. Low.
Leonard A. Powell.

Inventor:
William P. Collins,
by his attorney,
Charles S. Gooding.

UNITED STATES PATENT OFFICE.

WILLIAM P. COLLINS, OF BOSTON, MASSACHUSETTS.

BRAKE MECHANISM.

1,084,792. Specification of Letters Patent. Patented Jan. 20, 1914.

Application filed March 31, 1913. Serial No. 757,852.

*To all whom it may concern:*

Be it known that I, WILLIAM P. COLLINS, a citizen of the United States, residing at Boston, in the county of Suffolk and State of Massachusetts, have invented new and useful Improvements in Brake Mechanisms, of which the following is a specification.

This invention relates to new and useful improvements in brake mechanisms, particularly though not exclusively to brake mechanisms adapted for use in connection with vehicles.

The object of the invention is to provide a simple, compact and durable brake having a casing provided with a fluid chamber and a series of pistons adapted to draw fluid into and eject fluid from said chamber, the passage of said fluid to and from said chamber being regulated and controlled by valves which upon being opened or closed will either permit a free relative movement between said pistons and the casing comprising said fluid chamber or the movements of said members will be retarded.

The object of the invention is further to provide means for moving said pistons into a position within said fluid chamber during the relative movements between said chamber and said pistons.

The invention consists in the combination and arrangement of parts whereby the above objects and certain other objects hereinafter appearing are attained, as set forth in the following specification and particularly pointed out in the claims.

Figure 1:
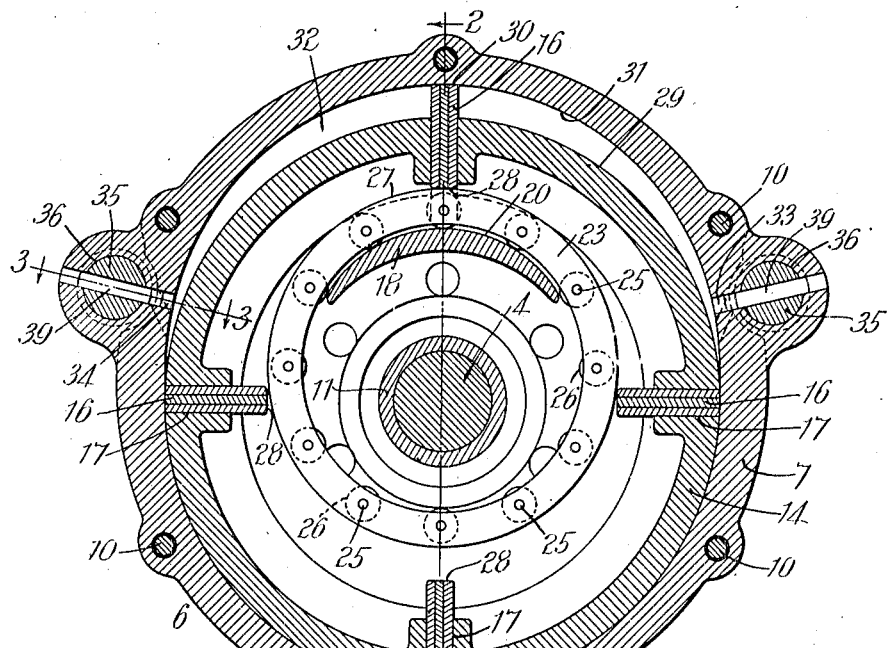
Figure 3:
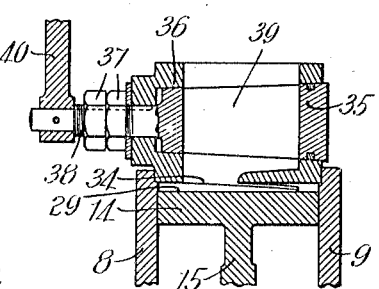
Figure 2:
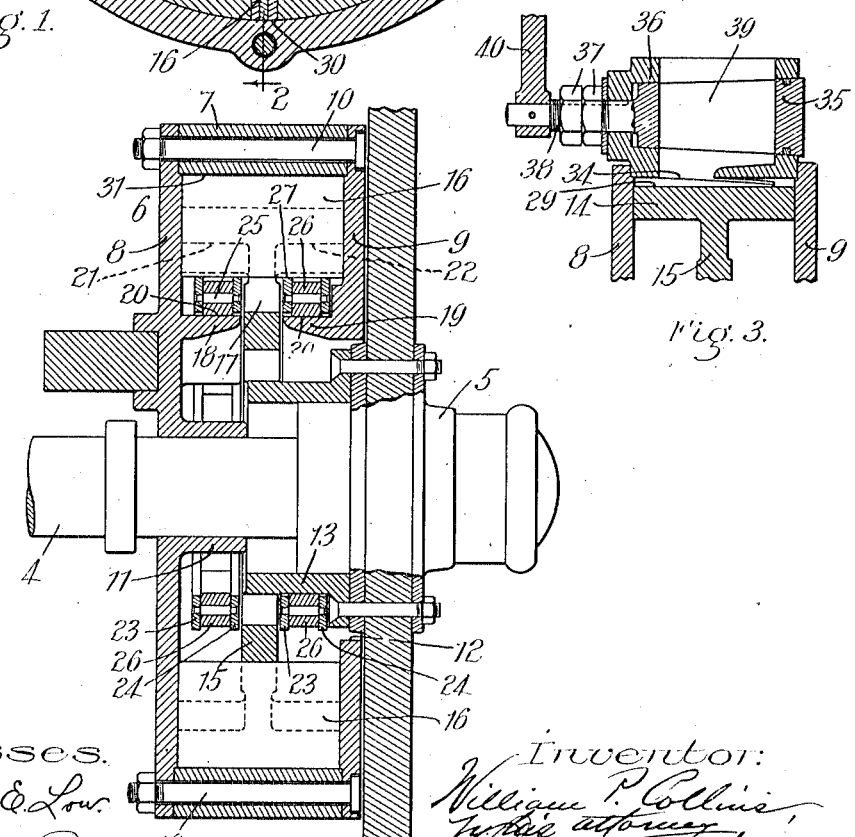

Referring to the drawings: Figure 1 is a transverse section, partly in elevation, through a brake mechanism embodying my invention. Fig. 2 is a section taken on line 2—2 of Fig. 1, with said device attached to a wheel and axle of a vehicle, portions of said wheel and axle being broken away to save space in the drawings. Fig. 3 is a sectional elevation taken on line 3—3 of Fig. 1.

Like numerals refer to like parts throughout the several views of the drawings.

In the drawings, 4 is an axle and 5 a wheel rotatably mounted on said axle, 6 is a casing which, in the present instance, is secured to the axle 4 and is therefore prevented from rotating on said axle. The casing 6 is constructed preferably in three parts, a cylindrical shaped body portion 7 and end plates 8 and 9 secured to said cylindrical body portion by bolts 10.

The plate 8 is arranged upon the inner end of said cylindrical body portion of the casing 7 and constitutes a support for the casing 6, said plate being provided with a hub 11 which engages the axle 4, while suitable means are provided to secure said plate 8 to said rear axle to prevent a relative rotary movement therebetween, said means not being shown in the drawings. The end plate 9 is adapted to close the outer end of said cylindrical body portion and is provided with an opening 12.

The wheel 5 is arranged in close proximity to the wall 9 and has secured thereto a hub 13 which extends inwardly from said wheel and provides a support for the inner side of said wheel upon said axle 4. The hub 13 has at its inner end a piston carrier 14 which is adapted to rotatably fit a portion of the casing 6, said carrier being connected to said hub by a central web 15.

A series of pistons 16 are arranged in slots 17 preferably radially disposed relatively to the axis of the piston carrier 14 and as said carrier is revolved within the casing 6 said pistons are adapted to be moved thereon during certain portions of the rotation of said carrier, by means consisting of segmental supports or brackets 18 and 19 which are formed upon the end plates 8 and 9 respectively, the outer peripheries 20 of said supports being arranged eccentrically relatively to the cylindrical portion of the casing 6.

The supports 18 and 19 extend laterally from said plates 8 and 9 respectively into recesses 21 and 22 formed in opposite ends of the piston carrier 14 and these supports are each adapted to sustain a pair of rings 23 and 24 which are connected together by studs 25 upon which are mounted rollers 26. These rollers are arranged adjacent the inner peripheries of said rings and project slightly therewithin and constitute roller bearings therefor.

The outer peripheries 27 of said rings 23 and 24 are adapted to engage the inner ends 28 of the pistons 16 during certain portions of the rotation of the piston carrier 14 and, as hereinbefore stated, force said pistons outwardly relatively to said carrier whereby the outer ends thereof project laterally beyond the periphery 29 of said carrier and cause said pistons to engage at their outer ends 30 the inner wall 31 of the casing 6, which constitutes the outer boundary of a fluid chamber 32, said chamber being formed by arranging the wall 31 eccentrically relatively to the center of the cylindrical portion of said casing 6, said center being coincident with the axis of the rotary carrier 14 and the wheel 5. The periphery or wall 31 is also substantially concentric with the outer periphery 20 of the segmental supports 18 and 19.

The piston carrier 14 is preferably cylindrical and consequently its periphery 29 and said inner periphery or wall 31 of the portion of the casing constituting the chamber 32 make said chamber substantially crescent shaped and as said pistons are revolved through said chamber the peculiar shape of said chamber and the movements of said pistons relatively thereto coöperate to perform the operation of drawing fluid into said chamber through an inlet port 33 arranged adjacent to one end of said chamber and ejecting fluid from said chamber through an outlet port 34 arranged adjacent to the opposite end thereof.

In the normal operation of the device the ports 33 and 34 are wide open and must be of a sufficient area to permit the fluid to be drawn into and ejected from said chamber 32 without in the least retarding the movements of the pistons 16 and in order to provide an opening of the proper area said ports are preferably arranged longitudinally of the cylindrically shaped portion 7, while rotary valves 35 are provided to open or close said ports, the median axial lines thereof being preferably arranged substantially parallel with the median axial line of the carrier 14. Furthermore these valves are slightly tapered to fit correspondingly tapered holes 36 in the casing 6 and are held in contact therewith by suitable means, preferably nuts 37 having screw-threaded engagement with the stem 38 thereof.

The valves 35 are provided with slots 39 which extend transversely through said valves and are adapted to register with the ports 33 and 34 when said valves are rotated, while levers 40 are arranged upon the ends of said valves and by which the same may be operated to open and close said ports and thereby regulate the passage of fluid therethrough. To prevent the pistons 16 from striking abruptly against the edges of said ports during their passage through said chamber the inner ends of said ports are arranged helically relatively to the inner periphery thereof and thereby permit the ends 30 of said pistons to ride smoothly across the same.

The device hereinbefore described, as stated, is constructed to be used as a brake for vehicles and the like. It is not the intention however to limit the device to this particular application as other uses may develop to which said device may be applied. Furthermore certain minor details of construction may also be changed and others substituted for those herein shown without departing from the spirit of the invention.

Having thus described my invention, what I claim and desire by Letters Patent to secure is:

1. A device of the class described embodying, in its construction, a casing comprising a fluid chamber, a piston carrier, a series of pistons on said carrier adapted to draw fluid into and eject fluid from said chamber, valves adapted to control the passage of fluid into and out of said chamber and means adapted to move said pistons relatively to said carrier, said means including a segmental support and a ring arranged on said support, and a series of rollers on said ring adapted to engage said support and constituting roller bearings.

2. In a rotary brake mechanism, a casing comprising a fluid chamber, a series of pistons adapted to revolve within said casing, the inner wall of said casing constituting said fluid chamber being eccentrically arranged relatively to the axis of rotation of said pistons, means to move said pistons into said chamber to draw fluid into and eject fluid therefrom, said means including a bracket on said casing, the outer periphery thereof arranged substantially concentric with said inner wall of said casing constituting said chamber, a pair of rings, and a series of rollers rotatably mounted between said rings adapted to engage the outer periphery of said support and permit said ring to be revolved on said support.

In testimony whereof I have hereunto set my hand in presence of two subscribing witnesses.

WILLIAM P. COLLINS.

Witnesses:
SYDNEY E. TAFT,
MARGARETTE F. FINNERTY.